United States Patent Office 3,095,386
Patented June 25, 1963

3,095,386
POLYURETHANE POLYMERS CONTAINING TALL OIL
George A. Hudson, New Martinsville, W. Va., assignor to Mobay Chemical Company, Pittsburgh, Pa., a corporation of Delaware
No Drawing. Filed May 31, 1960, Ser. No. 32,586
22 Claims. (Cl. 260—2.5)

This invention relates to polyurethane plastics. More particularly, this invention relates to novel combinations of polyurethane plastics with modifiers and/or extenders which do not deleteriously affect their physical properties and indeed, in many instances actually enhance the same.

Polyurethane plastics including moldings, castings, coatings, caulks, sealants, putties, adhesives, cellular polyurethane plastics and the like obtained from an organic polyisocyanate and an hydroxyl bearing material such as an hydroxyl polyester are well known. They have excellent physical properties and resistance to chemicals. When such polyurethanes are filled with nonreactive fillers the resulting products have not proven entirely satisfactory because in most cases the physical properties suffer proportionately with the amount of filler. Moreover, in polyurethane systems formulated to a given ratio of —NCO to active hydrogen it has not been considered practical to add a material that is reactive or potentially reactive with —NCO as a filler because the added material would upset the —NCO to active hydrogen balance and lead to unusable products. Still further, if the filler contains only one active hydrogen atom per molecule it may act as a chain stopper and, therefore, could be expected to greatly alter polymer properties. Substances containing carboxylic acid groups are particularly avoided because the reaction thereof with an isocyanate group produces carbon dioxide in addition to amides, anhydrides and disubstituted ureas. A representative reaction of this type wherein R is an organic radical is as follows:

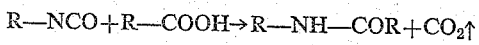
R—NCO+R—COOH→R—NH—COR+CO$_2$↑

The carbon dioxide produced can become trapped in the product and yield a product weakened by a porous structure. In some cases a cellular product having substantially uniform pores is produced. Where such products are desired this is of no consequence, but cannot be tolerated in the production of substantially nonporous polyurethane plastics.

In Australian Patent 205,456 the use of 20 percent to 80 percent by weight of liquid plasticizers boiling above about 200° C. has been proposed. In accordance with that process, the inert liquid is added to a reactant prior to the preparation of the final polyurethane product to make the product more flexible. While the products are more flexible when the plasticizer is included they suffer a proportionate loss in tensile strength, elongation and tear strength.

It is, therefore, an object of this invention to provide polyurethane plastics containing an inert extender which have not suffered significant loss in physical properties. Another object of this invention is to provide a process for the preparation of improved polyurethane plastics. A further object of the invention is to provide polyurethane plastics which are diluted with an extender and yet have satisfactory physical properties. Still another object of the invention is to provide a method of producing polyurethane plastics from raw materials which are less expensive than those used heretofore in the production of polyurethane plastics. Still another object of the invention is to produce polyurethane plastics which contain a greater proportion of a reactive filler than heretofore possible while maintaining the physical properties of the plastic at a satisfactory level. Further objects of the invention are to provide improved porous and nonporous polyurethane plastics as well as castings, moldings and coating compositions containing the same. Further objects of the invention are to provide processes for the production of improved polyurethane castings, moldings and coatings. Another object of the invention is to provide an improved modifier for polyurethane plastics which will enhance the physical properties thereof. Other objects of the invention are to provide polyurethane compositions for use as caulks, sealants, putties and adhesive applications. A further object of the invention is to provide a process for the casting of polyurethane plastics wherein the resulting casting may be demolded in a short time.

The foregoing objects and others which will become apparent from the following description are accomplished in accordance with the invention, generally speaking, by providing polyurethane plastics containing tall oil. The invention, therefore, provides for the production of improved polyurethane plastics which are prepared by reacting an organic polyisocyanate with an organic compound containing at least two active hydrogen containing groups as determined by the Zerewitinoff method, said groups being reactive with an isocyanate group, in the presence of tall oil and preferably tall oil which contains at least about 10 percent by weight of resin acids. In accordance with the process of the invention the polyurethane plastics are obtained by mixing an organic polyisocyanate with tall oil and an organic compound containing at least two active hydrogen containing groups as determined by the Zerewitinoff method which are reactive with an —NCO group. The polyisocyanate and the active hydrogen containing compound react to produce a polyurethane plastic, the tall oil remains substantially unreacted and is included in the product. It has been found that the amount of tall oil can vary over a wide range without adversely affecting the properties of the polyurethane plastic. Preferably, a maximum of about 50 percent by weight of the tall oil or less is used, but greater amounts may be used for some applications. Moreover, it is preferred to include at least about 10 percent by weight of tall oil in the reaction mixture. However, the invention also contemplates lower concentrations of down to about one percent by weight or less of tall oil in the product.

The process and product of the invention is to be distinguished from the modification of tall oil having a high percentage of fatty acids to prepare the so-called urethane oils. Such a process is disclosed in U.S. Patent 2,812,337 wherein distilled tall oil is esterified with a polyhydric alcohol and then reacted with a deficiency of an organic polyisocyanate to prepare a drying oil which contains urethane groups. In that process the tall oil is made reactive toward isocyanates by the incorporation of hydroxyl groups through the conventional esterification procedure. As distinguished from that process, the process of the present invention involves the incorporation of tall oil into the polyurethane plastic in substantially unmodified form.

It was to be expected that the tall oil which has a high acid number would react rapidly with any free isocyanate and yield a foamy unusable mass through the evolution of carbon dioxide. However, it has been found that the tall oil does not react appreciably and, moreover, when it is mixed with the reactants an improved product is obtained as more fully set forth below.

The term "tall oil" as used herein and in the claims designates the resinous substance obtained as a waste product in the manufacture of cellulose from pine wood. The composition of the tall oil and its properties are preferably within approximately the following ranges:

| | |
|---|---|
| Density | 0.95–1.02 |
| Acid number | 107–174 |
| Ash percent | 0.4–4.6 |
| Moisture do | 0.39–1.0 |
| Insoluble (petroleum ether) do | 0.1–8.5 |
| Fatty acids do | 18–70 |
| Resin acids do | 10–80 |
| Nonacid bodies do | 5–24 |
| Viscosity at— | |
| 18° C cp | 760–15×10$^6$ |
| 100° C cts | 150–1200 |

The composition of the tall oil used in the process of the present invention is important, particularly with regard to the resin acid content. The resin acid content may be as low as 0.1 percent by weight if the tall oil is to be used in the production of a cellular polyurethane plastic but in this instance it will react appreciably with the isocyanate. If the tall oil is to be used in the production of a substantially nonporous polyurethane plastic, it should contain at least about 10 percent resin acids to avoid appreciable reaction with the organic isocyanate and best results are obtained when the tall oil contains at least about 20 percent resin acids. This is a particularly important feature of the invention because crude tall oil obtained from the black liquor of the sulphate process of wood pulp manufacture, using resinous woods such as pine, normally contains from about 28 percent to about 65 percent resin acids and may, therefore, be used directly in the process of the invention, if the moisture content is kept below about 1 percent and preferably below about 0.5 percent for the production of substantially nonporous polyurethane plastics. Thus, in accordance with the process of the invention, crude tall oil which sells for about two cents per pound can be mixed with the components which lead to the production of a polyurethane plastic without adverse effects on the physical properties and indeed in some cases the physical properties of the polyurethane plastics including tensile strength and elongation are improved over that of the unfilled polyurethane product.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a block or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

Any suitable organic compound containing at least two active hydrogen containing groups as determined by the Zerewitinoff method, said groups being reactive with an isocyanate group, may be reacted with an organic polyisocyanate in the presence of tall oil in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5,000 with an hydroxyl number within the range of from bout 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate and tall oil can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerylthritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerylthritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and Encyclopedia of Chemical Technology, vol. 7, pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyesther amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexanediol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexane-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as, 1-hexene-1,3,6-triol and the like; alkyne triols such as, 2-hexyne-1,3,6-triol and the like; alkane tetrols such as, for example, 1,2,5,6-hexane tetrol and the like; alkene tetrols such as, for example 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino 5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N′,N′-tetrakis(2-hydroxy propyl)ethylene diamine, as well as compounds of any of the classes set forth above which are substituted with halogen such as, for example, chloro, iodo, bromo and the like; nitro; alkoxy, such as, for example methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

The process of the invention comprises mixing an organic polyisocyanate with an organic compound containing at least two active hydrogen containing groups as determined by the Zerewitinoff method, said groups being reactive with an isocyanate group in the presence of tall oil. There is no critical order of addition, reaction temperature or reaction time involved in this simple and convenient process. However, best results are obtained when the tall oil is mixed with an organic compound containing at least two active hydrogen containing groups as set forth above prior to combination with the organic polyisocyanate. When the tall oil is mixed with the organic polyisocyanate in a first step it shows more tendency to react than where the isocyanate has available for reaction an organic compound containing at least two active hydrogen containing groups which are reactive with an isocyanate group to yield a polyurethane plastic. Moreover, a preferred embodiment of the invention involves the reaction of one of the organic compounds containing at least two active hydrogen containing groups with an excess of an organic polyisocyanate in a first step to prepare an isocyanato-terminated prepolymer and then reacting said prepolymer with an organic compound containing at least two active hydrogen containing groups in the presence of tall oil. The preferred excess is sufficient to provide an —NCO to active hydrogen ratio between about 1.5 and 5. Preferably the organic compound containing at least two active hydrogen containing groups which is used in the formation of the isocyanato-terminated prepolymer has a molecular weight above about 500 and an hydroxyl number within the range of from about 25 to about 600 and an acid number, where applicable, below about 15 and most preferably below about 3. The organic compound containing at least two active hydrogen containing groups which is employed in the second step for reaction with the isocyanato-terminated prepolymer may be any of the organic compounds disclosed above and preferably has a molecular weight of up to about 5,000. Monomeric aliphatic diols such as, 1,4-butane diol, 1,3-butane diol and the like or a polyhydric alcohol such as castor oil, N,N,N',N'-tetrakis(2-hydroxy propyl)ethylene diamine, bis-β-hydroxy ethylene diamine and the like are suitable.

A preferred embodiment of this invention involves the production of substantially nonporous polyurethane plastics by the reaction of an organic polyisocyanate with at least a stoichiometric amount of an organic compound containing at least two active hydrogen containing groups as determined by the Zerewitinoff method, said groups being reactive with an —NCO group, in the presence of tall oil. Thus, the tall oil may be mixed with an organic compound essentially nonreactive therewith containing at least two active hydrogen containing groups as determined by the Zerewitinoff method and stored for a period of time prior to combination with either a monomeric organic polyisocyanate or an isocyanato-terminated prepolymer. This makes it possible to produce a two component system for the production of substantially nonporous polyurethane plastics including castings, coatings, moldings and the like. In the production of the nonporous polyurethane plastics, in accordance with this preferred embodiment of the invention, the —NCO to active hydrogen ratio is preferably within the range of from about 0.75 to about 1.0. It is preferred to mix the tall oil with an organic compound which is essentially nonreactive therewith at temperatures up to about 120° F. Suitable compounds which may be mixed with the tall oil and stored at temperatures up to about 120° F. are those which contain terminal —OH, —SH and the like groups. One should avoid mixing the tall oil with either a primary or secondary amines even at room temperature because the amino compounds will react with the tall oil to yield products which will adversely affect the physical properties of the polyurethane plastic. Still further, in order to minimize side reactions in the production of substantially nonporous polyurethane plastics it is desirable to maintain the temperature of the reaction components below about 100° C. The exotherm of the reaction mixture is usually below about 100° C. and therefore no cooling of the reaction mixture is necessary. In cases where amine-containing reactive compounds are used the amine-containing reactive compound, tall oil and polyisocyanate may be mixed simultaneously.

The process of the invention can be used for the preparation of castings, moldings and coating compositions including for example, caulks, sealants, putties, adhesives and surface coatings. Castings are prepared by mixing either a monomeric organic polyisocyanate or the above-described isocyanato-terminated prepolymer with an organic compound containing active hydrogen containing groups which are reactive with an isocyanate group, tall oil being included in the reaction mixture, preferably under substantially anhydrous conditions and preferably in an amount which corresponds to from about 10 percent to about 50 percent by weight of the final casting. Best results are obtained when an isocyanate-modified organic compound is reacted with an hydroxyl bearing organic compound having a molecular weight between about 90 and about 2,000 and an hydroxyl number between about 56 and about 940. Thus, for the production of hard, rigid materials one may use low molecular weight compounds having higher functionality based on hydroxyl groups and for flexible materials one may use high molecular weight compounds with lower functionality based on hydroxyl groups. Tall oil having at least about 20 percent resin acids can constitute up to about 50 percent by weight of these products. The resulting composition may be employed as a caulk, sealant or a putty for many useful applications. The composition has properties which are comparable to those obtained from the unfilled polyurethane plastic. Indeed, in many instances the physical properties of the casting are improved with regard to tensile strength and elongation. Excellent results are obtained from the reaction of an aromatic diisocyanate such as a mixture of 80 percent 2,4- and 20 percent 2,6-toluylene diisocyanate with an hydroxyl polyester, a polyhydric polyalkylene ether or polyhydric polythioether having two to four terminal hydroxyl groups in a first step to prepare an isocyanate-modified prepolymer and then reacting the resulting product with a mixture containing approximately the stoichiometric amount of polyol, having from two to six hydroxyl groups, necessary to react with all of the terminal —NCO groups, tall oil, having from about 20 percent to about 60 percent resin acids, being included in the reaction mixture in the second step. This tall oil preferably constitutes from about 10 percent to about 50 percent by weight of the final product.

In accordance with another embodiment of the invention moldings can be prepared by reacting the organic polyisocyanate with an organic compound containing at least two active hydrogen containing groups in a kneader or other suitable mixing device, the tall oil being incorporated into the reaction mixture in the kneader to obtain a crumbly mass which is then further reacted with an organic polyisocyanate, a polyamine, a polyol, water or other suitable cross-linking agent on a rubber mill and finally pressed into a mold and allowed to cure. Alternately, the crumbly mass may be prepared by reaction between the organic polyisocyanate and the organic compound containing at least two active hydrogen containing groups in the mixer and then the tall oil may be incorporated into the mixture on the rubber mill and finally pressed into a mold. Suitable processes for carrying out this type of reaction may be found in U.S. Patents 2,621,166 and 2,900,368.

Coating compositions can be prepared by reacting an organic polyisocyanate or isocyanate-modified prepolymer as described above with an organic compound containing at least two active hydrogen containing groups and, if desired, in an inert organic solvent therefor, said reaction mixture leading to the production of said coating composition containing tall oil and preferably not more than about 50 percent by weight of tall oil having at least about 10 percent resin acids. Any suitable inert organic solvent may be used such as, for example, xylene, ethyl acetate, toluene, ethylene glycol monoethylether acetate and the like. The resulting coating composition can be applied in any suitable fashion as by dipping, brushing, roller coating and the like, but is preferably applied by spraying onto the substrate. Any suitable substrate may be coated with the coating compositions of the invention such as, for example, wood, paper, porous plastics, such as, for example, sponge rubber, cellular polyurethane plastics, foamed polystyrene and the like as well as metals such as steel, aluminum, copper and the like. The coating composition need not contain a solvent for all applications. The coating composition of the invention may contain any suitable pigment such as, for example, iron oxide, carbon black, titanium dioxide, zinc oxide, chrome green, lithol red and the like. Flexible, chemically resistant coatings are obtained in accordance with the process of the invention. The coating compositions can also be used as adhesives in accordance with the present invention by applying the coating composition to a substrate to be bonded. No serious loss in adhesive strength results from the use of the tall oil in conjunction with the organic polyisocyanate and organic compound containing active hydrogen as an adhesive.

The tall oil may also be included in the reaction components leading to the production of cellular polyurethane plastics in accordance with any of the heretofore known processes for the production of cellular polyurethane plastics. Suitable processes for the preparation of cellular polyurethane plastics are disclosed in U.S. Reissue Patent 24,514 together with suitable machinery to be used in conjunction therewith. The tall oil is preferably mixed with the organic compound containing at least two active hydrogen containing groups and said active hydrogen containing compound is then reacted with an organic polyisocyanate and water to produce a cellular polyurethane plastic. In this embodiment of the invention it is preferred to cause the tall oil to react with the organic polyisocyanate to generate carbon dioxide and become chemically combined with the other components. The exotherm of the reaction mixture leading to the production of cellular polyurethane plastics is usually sufficient of itself to cause reaction between the tall oil and the organic polyisocyanate. Temperatures above about 110° C. are usually sufficient. If a blowing agent such as a halohydrocarbon, for example, dichlorodifluoromethane, trichlorofluoromethane or the like is included in the reaction mixture the water may be elimnated. Either the prepolymer referred to above may be reacted with water in the presence of tall oil to produce a cellular polyurethane plastic or in the alternative the organic polyisocyanate may be reacted with an organic compound containing at least two active hydrogen containing groups as determined by the Zerewitinoff method, said groups being reactive with an isocyanate group, to prepare a cellular polyurethane plastic in a one-step procedure. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

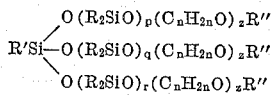

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

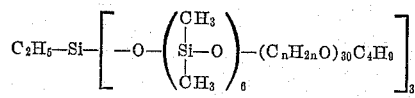

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, tin compounds such as, stannous chloride, tin salts of carboxylic acids, such as dibutyl tin di-2-ethyl hexoate, tin alcoholates such as stannous octoate, as well as other organo metallic compounds such as are disclosed in U.S. Patent 2,846,408 and in copending application S.N. 835,450.

Another advantageous feature of the invention is that when castings are prepared in accordance with the process set forth above, the demolding time is decreased so that assembly lines which use the caulks and sealants of the invention need not provide for long storage periods following injection of the casting mixture into a mold. Demolding time can be further decreased by including a divalent tin salt of a carboxylic acid or divalent tin alcoholate in the reaction mixture such as, for example, stannous octoate, stannous oleate and the like. Preferably not more than about one per cent by weight of the catalyst is used and usually amounts below about 0.25 percent by weight are sufficient.

The products of the invention are useful for many applications where the use of polyurethane plastics was heretofore considered uneconomical. Tall oil is a product which is available in large quantities and at various locations. This invention should open up new fields of application for polyurethane plastics which have been considered uneconomical heretofore because the raw material cost of the final product can be reduced by more than half if the teachings of this invention are followed. Thus, the products of the present invention are useful for the production of both sound and thermal insulation, gaskets, the potting of electrical components, bushings, the molding of the counter portion of shoes, shoe heels and the like.

The invention is further illustrated by the following examples in which the parts are by weight unless otherwise indicated.

Examples 1 through 31 demonstrate the preparation of castings. The prepolymers, active hydrogen compounds, tall oil and other components are vigorously mixed for about one minute at about 25–30° C. under substantially anhydrous conditions and the liquid reaction mixture is poured into metal trays coated with carnauba wax and allowed to cure at about 25–30° C. and then demolded as indicated in the table. Test samples are between about ⅛ and about 3/16 inch in thickness and are aged for about one week prior to conducting physical tests. In the table and in subsequent examples, prepolymers A through D are as follows:

A: About 1000 parts of an hydroxyl polyester obtained from ethylene glycol and adipic acid and having an hydroxyl number of about 56, an acid number less than one and a molecular weight of about 2,000 is reacted with about 375 parts of 4,4'-diphenylmethane diisocyanate to prepare an isocyanate-terminated prepolymer.

B: About 246 parts of a polyhydric polyalkylene ether obtained from 1,2,6-hexanetriol and propylene oxide and having an hydroxyl number of about 240 and a molecular weight of about 720 is reacted with about 216 parts of a mixture of 80 percent 2,4- and 20 percent 2,6-toluylene diisocyanate to prepare an isocyanate-modified polyether prepolymer.

C: About 47 parts of a polypropylene ether glycol having a molecular weight of about 2,000 and an hydroxyl number of about 56, about 31 parts of a polyether triol obtained from glycerine and propylene oxide and having a molecular weight of about 3,000 and an hydroxyl number of about 56 are reacted with about 23 parts of a mixture of 80 percent 2,4- and 20 percent 2,6-toluylene diisocyanate to prepare an isocyanate-modified prepolymer.

D: About 1,000 parts of a polythioether obtained from thiodiglycol, having a moleculer weight of about 2,000 and an hydroxyl number of about 56 is reacted with about 375 parts of 4,4'-diphenylmethane diisocyanate to prepare a prepolymer.

In the table and in subsequent examples, active hydrogen compounds A through I are as follows:

A: 1,4-butane diol.

B: N,N,N',N'-tetrakis(2-hydroxy propyl)ethylene diamine.

C: An hydroxyl polyester having a molecular weight of about 3,000 and an hydroxyl number of about 56 obtained from adipic acid, diethylene glycol and trimethylol propane.

D: An hydroxyl polyester obtained from phthalic anhydride, adipic acid and 1,3,6-hexanetriol, having a molecular weight of about 2,000 and an hydroxyl number of about 260.

E: A polyalkylene ether triol obtained from trimethylol propane and propylene oxide and having a molecular weight of about 418 and an hydroxyl number of about 404.

F: A polyether obtained from piperazine and propylene oxide and having a molecular weight of about 500 and an hydroxyl number of about 440.

G: N,N,N',N'-tetrakis(2-hydoxy ethyl)ethylene diamine.

H: Castor oil.

I: A polyether obtained from sorbitol and propylene oxide, having a molecular weight of about 516 and an hydroxyl number of about 660.

In the table and in subsequent examples, tall oil compositions A through G are as follows:

| Comp. | Resin acids | Fatty acids | Acid number | Unsap. | Moisture |
|---|---|---|---|---|---|
| A | 0.3 | 99.1 | 200 | 0.6 | 0.1 |
| B | [1] 2.0 | [2] 60.0 | 125-145 | 30-40 | [1] 0.5 |
| C | 0.1-1.5 | 50-80 | 100-160 | 20-50 | 0.3 |
| D | 0.1-1.5 | 78-88 | 160-180 | 12-20 | 0.0-.03 |
| E | 28.7 | 55 | 122 | 17 | 0.14 |
| F | 40.4 | 55.5 | 173 | 4.2 | |
| G | 12-30 | 8-24 | 60-85 | 10-12 | |

[1] Maximum.  [2] Minimum.

then combined with about 70 parts of a mixture of 80 percent 2,4- and 20 percent 2,6-toluylene diisocyanate, about 0.2 part of stannous octoate, about 0.9 part of N,N,N',N'-tetramethyl-1,3-butane diamine, about 1 part of a silicone oil having the formula

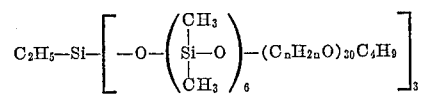

wherein $(C_nH_{2n}O)$ is a mixed polyoxyethylene and oxypropylene block copolymer containing about 17 oxyethylene units and about 13 oxypropylene units, and about 20 parts of trichlorofluoromethane in a machine mixer as disclosed in U.S. Reissue Patent 24,514. The resulting mixture is allowed to flow into a cardboard container where gas evolution and foaming takes place to produce a cellular polyurethane plastic. The resulting cellular polyurethane plastic has an amber color and has completed the free rise to its maximum height in about 210 seconds. The mixture begins to foam as evidenced by gas evolution within about 30 seconds from the time that the reaction mixture is allowed to flow into the mold. The cellular polyurethane plastic produced has a density of about 2 lbs./ft.$^3$ and has good load bearing properties.

*Example 34*

About 50 parts of tall oil B is mixed with about 50 parts of the polyether employed in Example 28 and then combined with about 53 parts of the mixture of toluylene diisocyanates employed in Example 33, about 0.4 part of stannous octoate, about 2 parts of N,N,N',N'-tetra-

| Ex. | Parts | Prepolymer | Parts | Active hydrogen compound | Parts | Tall oil | Demolding time, hours | Other | Tensile strength, lbs./sq. in. | Elongation, percent | Tear strength, p.s.i. | Hardness |
|---|---|---|---|---|---|---|---|---|---|---|---|---|
| 1 | 100 | A | 6.5 | A | | | 6.33 | | 1,700 | 480 | 245 | 87 Shore A. |
| 2 | 100 | A | 6.5 | A | 1 | E | 5.75 | | 2,300 | 530 | 285 | 85 Shore A. |
| 3 | 100 | A | 6.5 | A | 5 | E | 3.5 | | 1,900 | 500 | 205 | 79 Shore A. |
| 4 | 100 | A | 6.5 | A | 10 | E | 2.5 | | 2,600 | 560 | 195 | 80 Shore A. |
| 5 | 100 | A | 6.5 | A | 20 | E | 1.5 | | 2,400 | 540 | 175 | 77 Shore A. |
| 6 | 100 | A | 6.5 | A | 30 | E | 1.0 | | 1,500 | 490 | 150 | 74 Shore A. |
| 7 | 100 | A | 6.5 | A | 10 | F | 1.0 | | 1,800 | 520 | 185 | 79 Shore A. |
| 8 | 462 | B | 110 | B | 292 | E | .08 | | 1,115 | 20 | | 85 Shore B. |
| 9 | 462 | B | 110 | B | 292 | B | .08 | | 1,000 | 20 | | 85 Shore B. |
| 10 | 462 | B | 110 | B | 455 | E | .3 | | 750 | 50 | | 80 Shore B. |
| 11 | 34 | B | 83 | C | 25 | E | .5 | | 160 | 60 | 4 | 44 Shore A. |
| 12 | 462 | B | 110 | B | 292 | A | .5 | | Marked tendency to foam yielding a soft foamy product. | | | |
| 13 | 462 | B | 110 | B | 292 | B | .5 | | Reduced tendency to foam, yielding a soft product. | | | |
| 14 | 462 | B | 110 | B | 292 | C | .3 | | Some tendency to foam but yields a hard product. | | | |
| 15 | 462 | B | 110 | B | 292 | D | .3 | | Some tendency to foam but yields a hard product. | | | |
| 16 | 462 | B | 110 | B | 292 | E | .1 | | No tendency to foam. Yields a very hard product. | | | |
| 17 | 462 | B | 110 | B | 292 | F | .25 | | No tendency to foam. Yields a very hard product. | | | |
| 18 | 462 | B | 110 | B | 292 | G | .1 | | No tendency to foam. Yields a very hard product. | | | |
| 19 | 310 | B | 194 | D | 100 | E | .08 | | 2,100 | 15 | 125 | 55 Shore D. |
| 20 | 34 | B | 85 | C | | | .66 | Stannous octoate .5% | 220 | 50 | | 66 Shore A. |
| 21 | 46 | B | 21 | E | | | | | Transparent hard clear stiff material. | | | |
| 22 | 46 | B | 21 | E | 33 | F | | | Very soft flexible transparent material. | | | |
| 23 | 46 | B | 21 | E | 33 | A | | | Soft and flexible material. | | | |
| 24 | 46 | B | 21 | E | 33 | E | | | Stiffer than Example 22 or 23 but more flexible than Example 21. | | | |
| 25 | 46 | B | 21 | E | 33 | E | | Carbon black 10% | Black and tougher than Example 24. | | | |
| 26 | 46 | B | 21 | E | 33 | E | | Iron oxide 50% | Very little effect on flexibility as compared with Example 21. | | | |
| 27 | 687 | D | 45 | A | 146 | E | | | 2,400 | 540 | 175 | 75 Shore A. |
| 28 | 310 | B | 59 | G | 369 | E | | | 1,000 | 20 | | 85 Shore B. |
| 29 | 600 | C | 350 | H | 100 | E | | | 80 | 60 | 5 | 25 Shore A. |
| 30 | 310 | B | 86 | I | 198 | E | | | 900 | 30 | | 85 Shore B. |
| 31 | 310 | B | 132 | F | 110 | E | | | 2,400 | 540 | 175 | 80 Shore A. |

*Example 32*

About 46 parts of prepolymer B is mixed with about 21 parts of active hydrogen compound E, about 33 parts of tall oil E and about 100 parts of iron oxide in xylene to provide a mixture containing about 50 percent solids. This mixture is coated onto a piece of cellular polyurethane plastic and a red chemically resistant coating is obtained.

*Example 33*

About 25 parts of tall oil E are mixed with about 75 parts of a polyhydric polyalkylene ether obtained from sorbitol and propylene oxide having a molecular weight of about 650 and an hydroxyl number of about 562 and methyl-1,3-butane diamine, about 1 part of the silicone oil employed in Example 33 and about 20 parts of trichlorofluoromethane in a machine mixer as described in U.S. Reissue Patent 24,514. The resulting polyurethane plastic shows slight shrinkage after it has been allowed to harden and is somewhat friable but is nevertheless a useful material which can be used in the filling of wall panels and the like. The rigid cellular polyurethane plastic has a density of about 2 lbs./ft.$^3$.

*Example 35*

About 146 parts of a mixture of 80 percent 2,4- and 20 percent 2,6-toluylene diisocyanate are mixed with about 164 parts of a polyhydric polyalkylene ether having a molecular weight of about 720 and an hydroxyl number of about 240, about 73 parts of N,N,N',N'-tetrakis(2-hydroxy propyl)ethylene diamine and about 383 parts of tall oil E substantially simultaneously. The resulting plastic has a tensile strength of about 750 lbs./in.² and Shore A hardness of about 85.

It is to be understood that any other suitable reactant could be used in the foregoing examples in accordance with the teachings of this disclosure with satisfactory results and that the reactants and other components used in the working examples are solely for the purposes of illustrating the invention.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A solidified polyurethane polymer prepared from a reaction mixture which comprises at least about 10 percent by weight, based on the weight of the reaction mixture, of tall oil containing at least about 10 percent rosin acids, an organic polyisocyanate and an organic compound containing at least two active hydrogen containing groups as determined by the Zerewitinoff method, said active hydrogen containing groups being reactive with an —NCO group.

2. The polyurethane polymer of claim 1 wherein said tall oil contains from about 10 to about 80 percent rosin acids.

3. The polyurethane polymer of claim 1 wherein said tall oil contains from about 20 to about 60 percent rosin acids.

4. The polyurethane polymer of claim 1 wherein the amount of tall oil is from about 10 to about 50 percent by weight.

5. A solidified cellular polyurethane polymer prepared from a reaction mixture which comprises at least about 10 percent by weight, based on the weight of the reaction mixture, of tall oil containing at least about 10 percent rosin acids, an organic polyisocyanate, an organic compound containing at least two active hydrogen containing groups as determined by the Zerewitinoff method, said active hydrogen containing groups being reactive with an —NCO group, and a blowing agent.

6. The solidified cellular polyurethane polymer of claim 5 wherein said blowing agent is water.

7. The solidified cellular polyurethane polymer of claim 5 wherein said blowing agent is a halohydrocarbon.

8. A solidified polyurethane polymer prepared from a reaction mixture which comprises at least about 10 percent by weight, based on the weight of the reaction mixture, of tall oil containing at least about 10 percent rosin acids, an organic polyisocyanate and an organic compound having a molecular weight of at least about 500 selected from the group consisting of a polyhydric polyalkylene ether, a polyhydric polythioether and an hydroxyl polyester prepared by a process which comprises reacting a polycarboxylic acid with a polyhydric alcohol.

9. A solidified cellular polyurethane polymer prepared from a reaction mixture which comprises at least about 10 percent by weight, based on the weight of the reaction mixture, of tall oil containing from about 20 percent to about 60 percent rosin acids, a blowing agent, an organic polyisocyanate and an organic compound having a molecular weight of at least about 500 and selected from the group consisting of a polyhydric polyalkylene ether, a polyhydric polythioether and an hydroxyl polyester prepared by a process which comprises reacting a polycarboxylic acid with a polyhydric alcohol.

10. A solidified polyurethane polymer prepared from a reaction mixture which comprises at least about 10 percent by weight, based on the weight of the reaction mixture, of tall oil containing from about 20 percent to about 60 percent rosin acids, an organic polyisocyanate and N,N,N',N'-tetrakis-(2-hydroxy propyl)ethylene diamine.

11. A solidified cellular polyurethane polymer prepared from a reaction mixture which comprises at least about 10 percent by weight, based on the weight of the reaction mixture, of tall oil containing from about 20 percent to about 60 percent rosin acids, an organic polyisocyanate, N,N,N',N'-tetrakis-(2-hydroxy propyl)ethylene diamine and a blowing agent.

12. The polyurethane of claim 10 wherein said organic polyisocyanate is a toluylene diisocyanate.

13. The polyurethane of claim 10 wherein said organic polyisocyanate is 4,4'-diphenyl methane diisocyanate.

14. A solidified cellular polyurethane polymer prepared from a reaction mixture which comprises at least about 10 percent by weight, based on the weight of the reaction mixture, of tall oil containing at least about 10 percent by weight rosin acids, a blowing agent, a tin compound, an organic polyisocyanate and a polyhydric polyalkylene ether.

15. The solidified cellular polyurethane polymer of claim 14 wherein said tin compound is a tin salt of a carboxylic acid.

16. A solidified cellular polyurethane polymer prepared from a reaction mixture which comprises at least about 10 percent by weight, based on the weight of the reaction mixture, of tall oil containing at least about 10 percent by weight rosin acids, a blowing agent, a tin compound, an alkyl silane polyoxyalkylene block copolymer having the formula

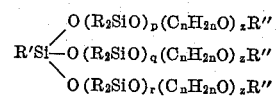

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34, an organic polyisocyanate and a polyhydric polyalkylene ether.

17. A solidified cellular polyurethane polymer prepared from a reaction mixture which comprises at least about 10 percent by weight, based on the weight of the reaction mixture, of tall oil containing from about 20 percent to about 60 percent rosin acids, a blowing agent, a tin catalyst, an alkyl silane polyoxyalkylene block copolymer having the formula

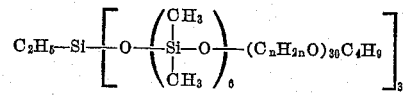

wherein $(C_nH_{2n}O)$ is a mixed polyoxyethylene and oxypropylene block copolymer containing about 17 oxyethylene units and about 13 oxypropylene units, an organic polyisocyanate and a polyhydric polyalkylene ether having a molecular weight of at least about 500 prepared by a process which comprises reacting sorbitol with propylene oxide.

18. The cellular polyurethane of claim 17 wherein said blowing agent is a halohydrocarbon.

19. The cellular polyurethane of claim 17 wherein said tin catalyst is stannous octoate.

20. The cellular polyurethane of claim 17 wherein said tin catalyst is a tin salt of a carboxylic acid.

21. The polyurethane of claim 1 wherein said organic polyisocyanate is a toluylene diisocyanate.

22. The polyurethane of claim 1 wherein said organic polyisocyanate is 4,4'-diphenyl methane diisocyanate.

References Cited in the file of this patent

UNITED STATES PATENTS 2,968,575   Mallonee _____ Jan. 17, 1961